United States Patent
Appanna et al.

(10) Patent No.: US 7,613,118 B2
(45) Date of Patent: Nov. 3, 2009

(54) DETECTING CHANGE IN A TRANSPORT PROTOCOL WINDOW SIZE WITHOUT DATA TRANSMISSION

(75) Inventors: Chandrashekhar Appanna, Cupertino, CA (US); Anantha Ramaiah, Sunnyvale, CA (US); Amol Khare, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 682 days.

(21) Appl. No.: 11/133,622

(22) Filed: May 19, 2005

(65) Prior Publication Data

US 2006/0268710 A1 Nov. 30, 2006

(51) Int. Cl.
*G01R 31/08* (2006.01)
*G06F 12/00* (2006.01)

(52) U.S. Cl. ........................ 370/235; 707/204
(58) Field of Classification Search ................. 370/236
See application file for complete search history.

(56) References Cited

U.S. PATENT DOCUMENTS

| | | | | |
|---|---|---|---|---|
| 5,014,221 | A * | 5/1991 | Mogul | 358/1.14 |
| 2004/0006643 | A1* | 1/2004 | Dolson et al. | 709/246 |
| 2004/0044761 | A1* | 3/2004 | Phillipi et al. | 709/223 |
| 2004/0236802 | A1* | 11/2004 | Baratakke et al. | 707/204 |

OTHER PUBLICATIONS

Cisco Systems, "Configuring Health Monitoring," Catalyst 6000 Family Content Switching Module Installation and Configuration Note, Chapter 6, 6 pages, 2005.
Persson, Anders et al., "TCP Probe: A TCP with built—in Path Capacity Estimation," UCLA Network Research Lab, Computer Science Dept., 2005, 6 pages.
Persson, Anders et al., "TCP Probe: A TCP with built—in Path Capacity Estimation," UCLA Network Research Lab, Computer Science Dept., PowerPoint Presentation, Mar. 18, 2005, Global Internet 2005, 22 pages.

* cited by examiner

*Primary Examiner*—Huy D. Vu
*Assistant Examiner*—John Blanton
(74) *Attorney, Agent, or Firm*—Hickman Palermo Truong & Becker LLP

(57) ABSTRACT

A method detects a change in TCP receive window size while preventing fragmentation of data. A TCP stack receives a segment that advertises a receive window size of zero. If data needs to be sent, and only if so, a timer is started. When the timer expires, a TCP segment that contains a first sequence number value equal to second sequence number representing sent but unacknowledged data minus one, and a segment length value of zero, is sent. Without sending a fragment of data, this triggers a peer TCP process to send an updated window size. A TCP ACK segment is received and contains an updated receive window size. If the updated receive window size is greater than a specified value, then the data is sent. Otherwise, a counter is incremented, and the steps are reperformed if the counter is less than a specified value.

31 Claims, 5 Drawing Sheets

DETECTING CHANGE IN A TRANSPORT PROTOCOL WINDOW SIZE WITHOUT DATA TRANSMISSION

FIELD OF THE INVENTION

The present invention generally relates to network transport-layer communication protocols. The invention relates more specifically to techniques for detecting a change in a transport protocol window size, such as the send-window size in Transmission Control Protocol (TCP), without sending fragmented data.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Data networks use transport-layer protocols to regulate the movement of data packets among network elements. In the standards-based internetworks known as the Internet, Transmission Control Protocol ("TCP") is a foundational protocol that provides transport-layer services. TCP is defined in Internet Engineering Task Force (IETF) Request for Comments (RFC) 793. A software implementation of TCP is often known as a TCP stack. A TCP stack may be implemented in a router, switch, or other element of network infrastructure, or in a personal computer, server, workstation, or other end station device. The term "host" encompasses both network elements and end station devices. Two devices that have respective TCP stacks and communicate according to TCP are often called TCP peers or peer hosts. The basic unit of communication under TCP is a segment, which is encapsulated in an Internet Protocol (IP) packet when IP is the network layer protocol.

Data communication protocols often provide a way for a receiving host to signal a sending host that the receiving host cannot accept more data, for example, because receiving buffers of the receiving host are full. To provide such signaling, TCP defines a segment attribute termed the window size. When a receiving host receives a data segment but cannot accept further data thereafter, the receiving host sends an acknowledgment TCP segment ("ACK segment") that contains a window size value of zero. A sending host, upon receiving a window size value of zero, understands that the receiver cannot accept more data, and must not send any more data.

However, the sending host needs a way to determine, subsequently, when the receiving host is again ready to receive data. In one approach, a sending host sends a probe segment that contains one byte of additional data. The purpose of the probe segment is to induce the receiving host to send back another ACK segment that contains an updated window size value. If the receiving host truly cannot accept more data, then the one byte of data in the probe segment may be lost, and re-transmission will be required. Moreover, sending even one byte of data when the receiving host has advertised a window size of zero is a technical violation of the protocol, because a window size of zero means "send nothing."

Further, if the receiving host can accept exactly one byte, then the transmission may be successful, but such transmission is highly inefficient and results in a great degree of fragmentation of a larger data payload. In certain applications, avoiding fragmentation is desirable. For example, an application such as BGP running on top of TCP may have policy that requires BGP to send only complete protocol data units (PDUs) to counterpart peer processes. For these applications, policy dictates that a sending host should send data only when it can do so efficiently, for example, by sending a data segment that contains a specified minimum number of bytes, such as a complete PDU.

Based on the foregoing, there is a clear need in the field for an improved technique of determining when a window size has changed to a value other than zero. There is a particular need for a technique that can achieve such a determination without sending fragmented data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
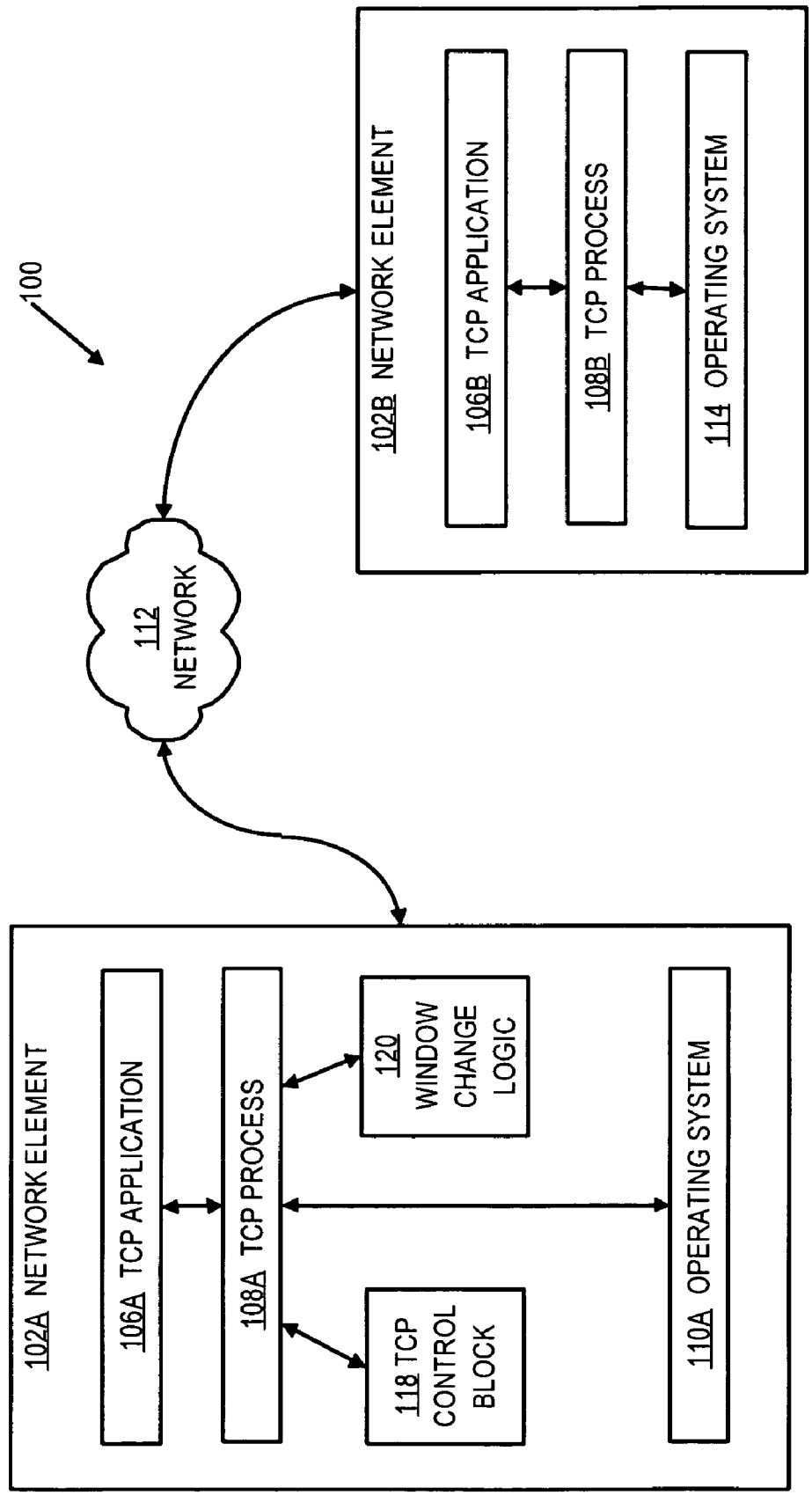
FIG. 1A is a block diagram that illustrates an example network arrangement in which an embodiment may be used.

A method and apparatus for detecting a change in a transport protocol window size is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
      2.1 Example Network Arrangement
      2.2 Typical TCP Probe Method
      2.3 Method of Detecting Window Size Change Without Sending Fragmented Data
      2.4 Benefits of Certain Embodiments
   3.0 Implementation Mechanisms—Hardware Overview
   4.0 Extensions and Alternatives 1.0 General Overview The needs identified in the foregoing Background, and other needs and objects that will become apparent for the following description, are achieved in the present invention, which comprises, in one aspect, a method that detects a change in TCP window size while preventing fragmentation of data. A TCP stack receives a segment that advertises a window size of zero. If data needs to be sent, and only if so, a timer is started. When the timer expires, a TCP segment that contains a first sequence number value equal to second sequence number representing sent but unacknowledged data minus one, and a segment length value of zero, is sent. Without sending a fragment of data, this triggers a peer TCP process to send an updated window size. A TCP ACK segment is received and contains an updated window size. If the updated window size is greater than a specified value, then the data is sent. Otherwise, a counter is incremented, and the steps are re-performed if the counter is less than a specified value.

According to another aspect, the invention provides a method of detecting a change in a transport protocol window size performed by a transmission control protocol (TCP) process in a network element, comprising the computer-implemented steps of receiving, from a TCP application, a first TCP segment that advertises a first window size of zero; determining whether data needs to be sent to the TCP application, and only if so: starting a timer; when the timer expires, creating and sending a second TCP segment that contains a first sequence number value equal to second sequence number of sent but unacknowledged data minus one, and a segment length value of zero; receiving a TCP ACK segment that acknowledges the second TCP segment and that contains a second window size; determining whether the second window size is greater than a specified value; sending the data to the TCP application only when the second window size is greater than the specified value; incrementing a counter when the data is not sent to the TCP application; and re-performing the steps of creating and sending only when the counter is less than a specified value.

According to one feature, the specified value is selected to prevent excessive fragmentation of the data. According to another feature, a TCP stack of a router performs the steps.

In another aspect, the invention provides a method comprising the computer-implemented steps of receiving a first data segment that comprises a first window size of zero; creating and sending a second segment that contains a first sequence number value equal to a second sequence number of sent but unacknowledged data minus one, and a segment length value of zero; receiving a third segment that comprises a second window size; and sending data only when the second window size is greater than a specified value.

According to one feature, the specified value is selected to prevent excessive fragmentation of the data. In another feature, a timer is set after the determining step, and the steps of creating and sending are performed only when the timer expires. In yet another feature, a counter is incremented when the data is not sent, and wherein the steps of creating and sending are re-performed only when the counter is less than a specified value.

In still another feature, a TCP stack of a router performs the steps. In yet another feature, the first data segment, second segment, and third segment are TCP segments. In a further feature, the creating and sending steps are performed only when data needs to be sent.

In other aspects, the invention encompasses a computer apparatus and a computer-readable medium configured to carry out the foregoing steps.

2.0 Structural and Functional Overview 2.1 Example Network Arrangement

FIG. 1A is a block diagram that illustrates an example network arrangement in which an embodiment may be used. In network arrangement 100 at least a first network element 102A is communicatively coupled through a network 112 to a second network element 102B. For purposes of illustrating a clear example, in FIG. 1 two network elements 102A, 102B are shown, but in other embodiments network arrangement 100 may include any number of network elements.

Network elements 102A, 102B communicate using a transport-layer protocol based on data segments such as transmission control protocol (TCP) as defined in IETF RFC 793, Stream Control Transmission Protocol (SCTP), etc. Typically, but not necessarily, network elements 102A, 102B are routers or switches and network 112 is a packet-switched network. However, the techniques herein are applicable to any other network elements, such as personal computers, workstations, servers, printers, etc., which implement TCP or another protocol for transport-layer connectivity. Any protocol in which receiving hosts advertise window sizes may be used.

The first network element 102A comprises an operating system 110A, TCP process 108A, and TCP application 106A. Operating system 110 controls and supervises operations of hardware elements of network element 102A and other applications and processes. TCP process 108A runs logically on top of operating system 110 and implements the TCP protocol. TCP process 108A may be implemented as part of a protocol stack or using one or more other software elements. The TCP application 106A is any other application or protocol that uses TCP connections, which are established by TCP process 108A, for communications or messaging. For example, TCP application 106A may be a BGP process, label distribution protocol (LDP) process, multicast source distribution protocol (MSDP) process, or any other process that uses TCP connections.

The second network element 102B hosts a corresponding TCP application 106B and TCP process 108B, which run under the supervision and control of a second operating system 114. In this arrangement, TCP processes 108A, 108B are TCP peers and establish one or more TCP connections among themselves as provided in RFC 793. TCP applications 106A, 106B also act as peers and communicate with one another using the TCP connections.

First network element 102A creates one or more TCP control blocks 118 for storing and managing metadata relating to TCP connections between the first network element and the second network element 102B. First network element 102A further hosts window change logic 120. The logic 120 may be integrated into TCP process 108A. Logic 120 comprises one or more computer program instructions or other software elements that implement the methods described herein with respect to FIG. 2, FIG. 3.

2.2 Typical TCP Probe Method

Figure 1B:
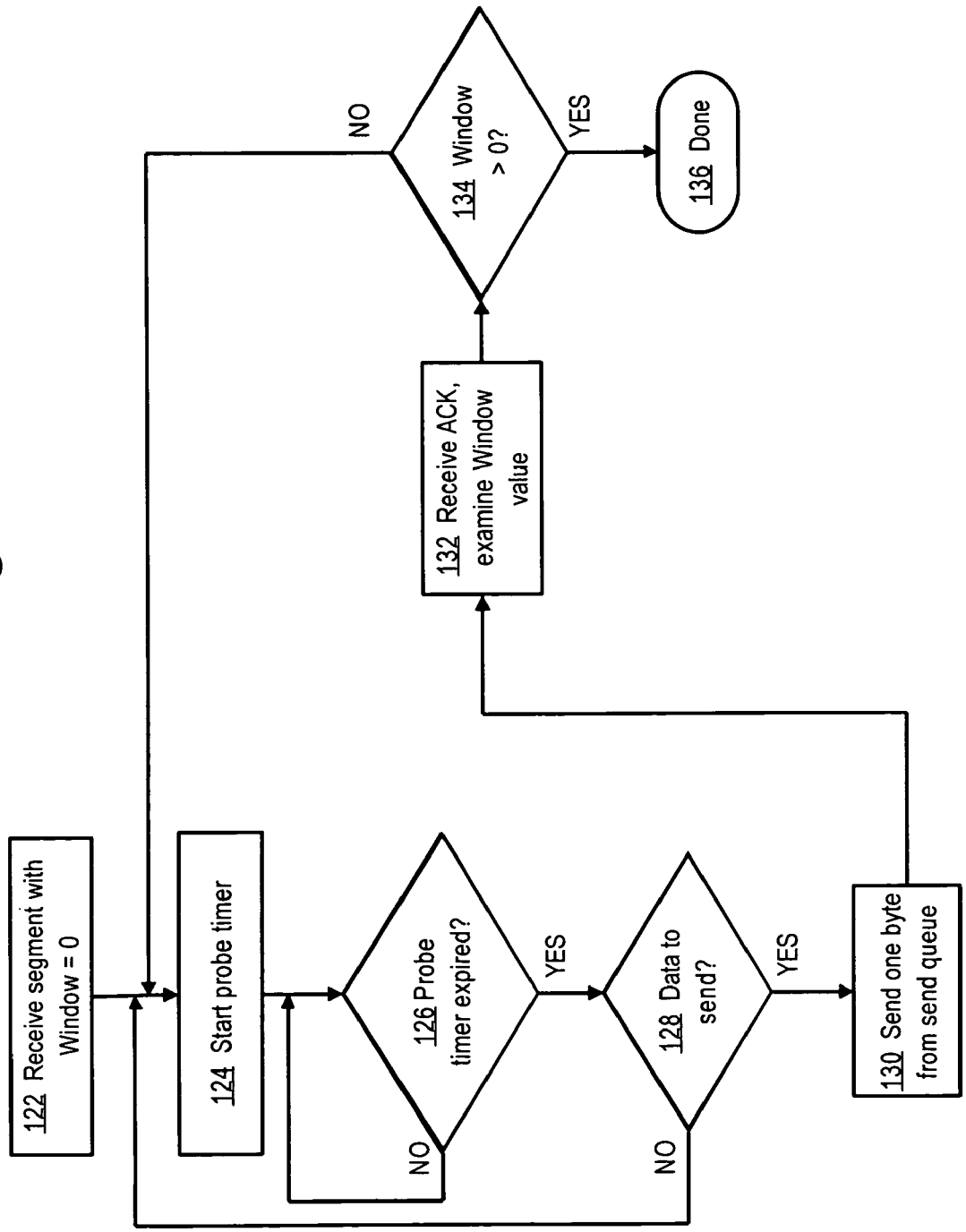
FIG. 1B is a flow diagram that illustrates a probe segment approach for detecting a change in a window size.

FIG. 1B is a flow diagram that illustrates a probe segment approach for detecting a change in a window size. FIG. 1B represents a conventional approach having certain disadvantages that are overcome by the other approaches herein.

At step 122, a segment having a window value of zero is received. For example, TCP process 108A is sending data that TCP process 108B receives, and TCP process 108A receives a TCP ACK segment carrying a window value of zero. By this segment, TCP process 108B is informing TCP process 108A that the receiving process cannot receive further data. At step 124, a probe timer is started. The timer is a software function that expires at a specified fixed time. At step 126, a test is performed to determine if the probe timer is expired. If not, then control returns to await expiration of the timer.

If the timer has expired, then in step 128, a test is performed to determine if data is available for sending. If data needs to be sent, then in step 130, a TCP segment having a segment length of one, and carrying one byte of data, is sent. Step 130 induces the TCP peer host to send an ACK segment, which is received and examined at step 132. If the window value in the received ACK segment is greater than zero, then the process is complete at step 136, and the sending TCP host can continue to send other data segments until the data limit represented by the window is reached. Alternatively, control returns to step 124, at which another probe timer is started.

Although this approach results in obtaining an updated window size value, it has disadvantages. If the receiving host truly cannot accept more data, then the one byte of data in the probe segment may be lost, and re-transmission will be required. Moreover, sending even one byte of data when the receiving host has advertised a window size of zero is a technical violation of the protocol, because a window size of zero means "send nothing." Further, if the receiving host can accept exactly one byte, then the transmission may be successful, but such transmission is highly inefficient and results in a great degree of fragmentation of a PDU or other data payload.

2.3 Method for Detecting Window Size Change Without Sending Fragmented Data

Figure 2:
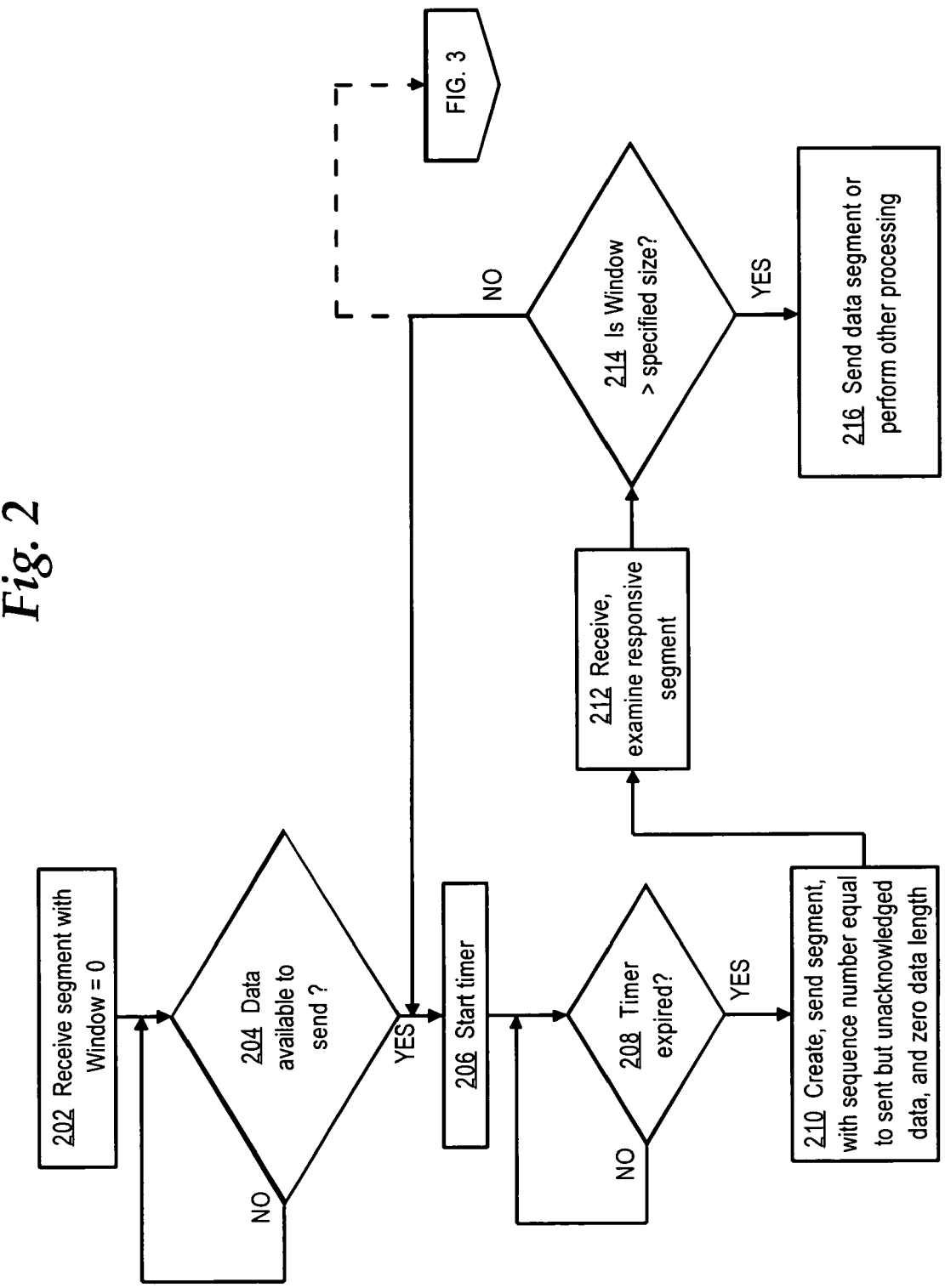
FIG. 2 is a flow diagram that illustrates an embodiment of a method for detecting a change in a window size without sending fragmented data.
Figure 3:
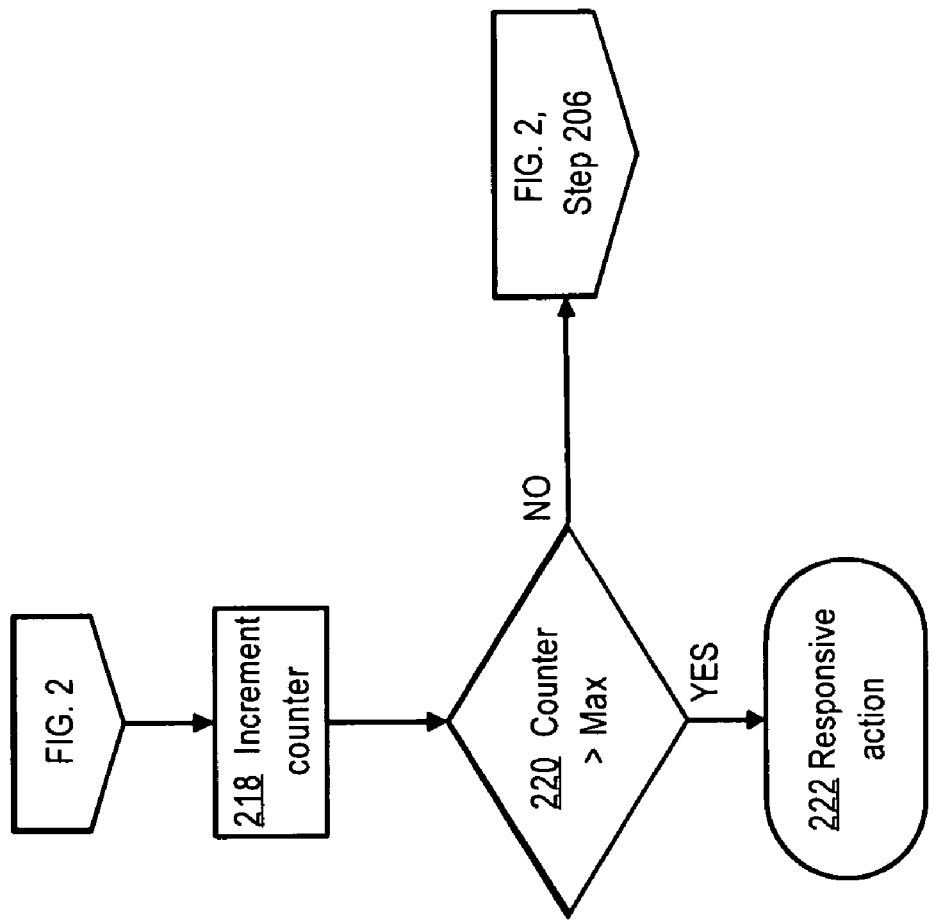
FIG. 3 is a flow diagram showing further steps in the method of FIG. 2.

FIG. 2 is a flow diagram that illustrates an embodiment of a method for detecting a change in a window size without sending fragmented data.

At step 202, a segment having a zero-size window value is received. For example, TCP process 108A is sending data that TCP process 108B receives, and TCP process 108A receives a TCP ACK segment carrying a window value of zero. By this segment, TCP process 108B is informing TCP process 108A that the receiving process cannot receive further data.

At step 204, a test is performed to determine if data is in a send queue. Thus, step 204 represents testing, in a TCP implementation, whether data needs to be sent. If not, then control returns to wait for data to enter the send queue. As a result, no further steps are performed unnecessarily.

At step 206, if data is in the send queue, then a probe timer is started. At step 208, a test is performed to determine if the timer has expired. If not, then control returns to await expiration of the timer. The purpose of steps 206, 208 is to interpose a brief delay to allow for the receiving host to process some data so that it may later advertise a window size greater than zero.

If the timer set at step 206 has expired, then control transfers to step 210, at which the process creates and sends a segment having a sequence number equal to the amount of data that has been sent but not acknowledged by the receiver, minus one, and having a segment length of zero. In a TCP implementation, the sequence number representing the amount of sent but unacknowledged data is sometimes stored in a program variable denoted "snduna". Thus, the sequence number formed at step 210 may be expressed as (snduna—1).

Sending a segment with these values induces a peer process to return a responsive segment with an updated window value. The peer process returns a responsive segment because the sequence number set at step 210 represents a data segment that is old or already acknowledged, and as defined in RFC 793 under such circumstances the TCP protocol requires a receiving peer to send back a corrective ACK segment that specifies the correct sequence number, ACK number and an updated window size value.

However, the segment created at step 210 has the advantage of containing no data, and therefore the approach herein avoids sending fragmented data or sending data in technical violation of the TCP standard. The approach also does not consume application data with the potential for loss of that data.

Further, other possible values for the sequence number at step 210 would not produce a proper solution when used with TCP-compliant peers. For example, if step 210 sets the sequence number to the "rcvnxt" value, then the peer process would initiate a fast re-transmit process. In particular, if the receiving peer receives a sequence number matching the next expected sequence number ("rcvnxt"), then the receiving peer would treat that segment as a duplicate AACK segment, and if the then-current number of duplicate ACKs exceeds a specified strike value (usually 2 or 3), unnecessary fast re-transmission would result. Performing a fast ret-transmit is inappropriate because the problem herein is how to acquire an updated window size value without sending fragmented data, and re-transmission could increase fragmentation.

At step 212, a responsive segment is received and examined. In a TCP embodiment, an ACK segment is received. At step 214, a test is performed to determine if the updated window value in the acknowledgement segment is greater than a specified size. The specified size may be any value greater than zero. Typically the specified size is selected as an integer value large enough to prevent unwanted data fragmentation. For example, the specified size could be 128 bytes. If the test of step 214 is positive, then the window size of the receiving peer has enlarged enough, as a result of normal data processing at the receiving peer during the period of the timer, to permit the sending peer to send data in an efficient, non-fragmented manner. Therefore, at step 216, a data segment is sent. Step 216 also encompasses preparatory steps necessary or appropriate before sending data, and other appropriate data processing steps after sending data.

If the test of step 214 is negative, then the window size of the receiving peer has not enlarged enough to permit sending data in an efficient, non-fragmented manner. Therefore, control returns to step 206 at which the subsequent steps may repeat. In an optional alternative, control may transfer to FIG. 3. At step 218 of FIG. 3, a counter is incremented. The counter counts the number of times that the process of FIG. 2 has been performed. If the counter is greater than a specified maximum count, as tested at step 220, then responsive action may be taken at step 222. For example, the process may notify a higher-order application such as TCP application 106A that the window of the receiving peer has been constricted for an unacceptable time period.

If the specified maximum count is not exceeded, then control returns to FIG. 2, step 206, at which the subsequent steps may repeat. In this way, the process of FIG. 2 can periodically check to determine if the receiving peer has processed data and expanded its window. However, in a TCP implementation, the periodic checks do not violate the TCP protocol and do not require sending even one byte of data, avoiding fragmentation.

The interval of the timer that is set and tested at steps 206, 208 may be made configurable through an appropriate programmatic interface or user interface. The specific time interval is not critical.

If both the receive and window size values of the respective peers become zero, then the approach herein will still work, because each incorrect ACK represented by the segment formed at step 210 will solicit a peer to send a correct ACK segment with current window size information.

For purposes of illustrating a clear example, FIG. 2 has been described herein with reference to the elements of FIG. 1A. However, the techniques described herein may be used with many other network arrangements, and the techniques are not limited to the particular arrangement of FIG. 1A.

2.4 Benefits of Certain Embodiments

The techniques described herein offer numerous benefits. For example, the techniques described herein are effective in obtaining an updated window size value without actually sending data. The approach can probe for a change in window size without violating the TCP protocol, thus essentially respecting a peer that advertises a window size of zero.

Further, no application data is used, and the approach avoids causing fragmentation of application PDUs by sending single-byte values. Probe segments are sent only when a sending host actually has data in its send queue, avoiding unnecessary steps. The approach does not induce so-called "ACK wars" in which peers to a TCP connection repeatedly send corrective ACK segments attempting to re-set values of the other peer.

The approach herein is compatible with any TCP stack implementation and is thus "backward compatible."

3.0 Implementation Mechanisms—Hardware Overview

Figure 4:
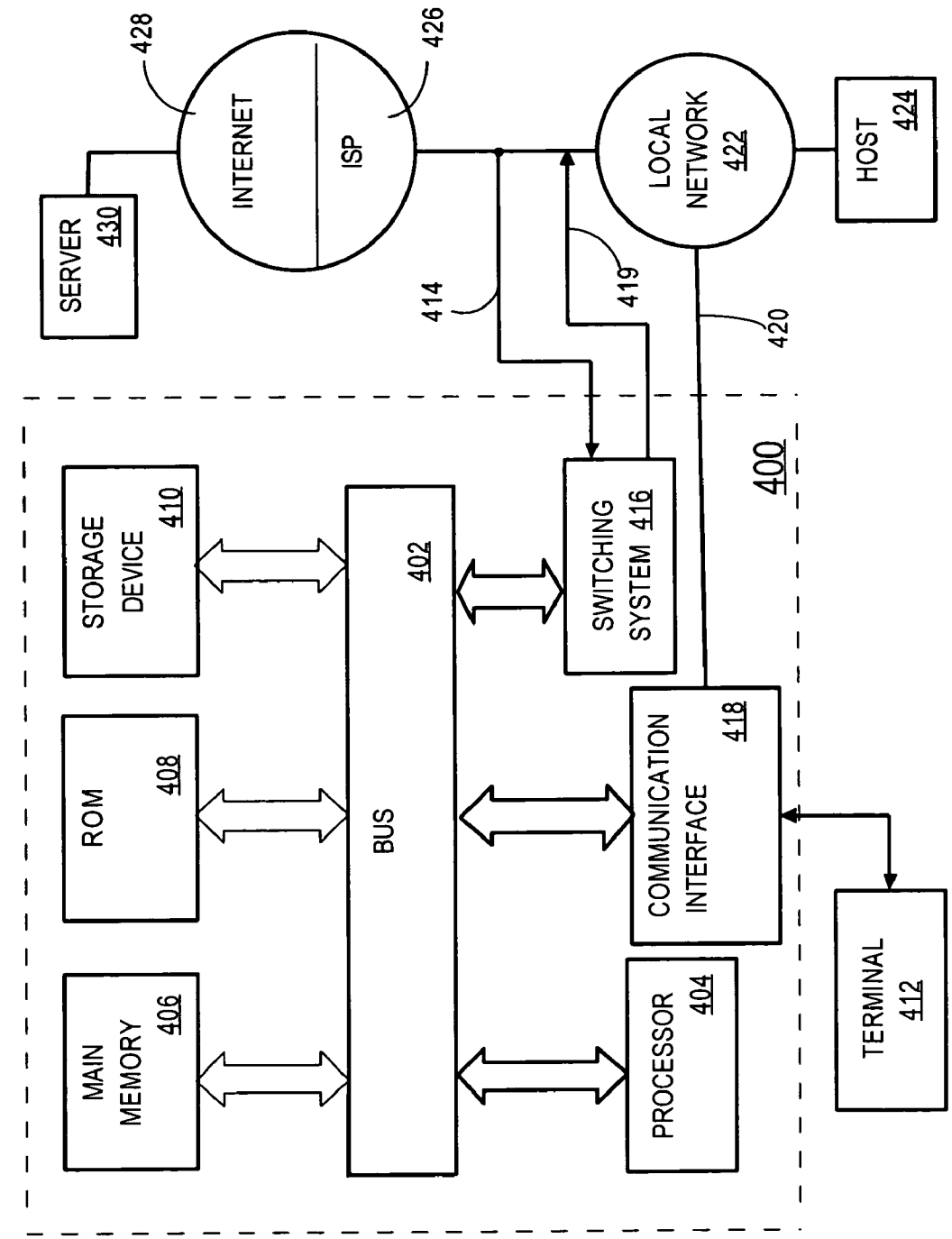
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for detecting a change in a transport protocol window size. According to one embodiment of the invention, detecting a change in a transport protocol window size is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for detecting a change in a transport protocol window size as described herein.

Processor 404 may execute the received code as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of detecting a change in a transport protocol window size performed by a transmission control protocol (TCP) process in a network element, comprising the computer-implemented steps of:

receiving, from a TCP application, a first TCP segment that advertises a first receive window size of zero;

determining whether data needs to be sent to the TCP application, and only if so and in response to the receiving and determining:

starting a timer;

when the timer expires, creating and sending a second TCP segment that contains a first sequence number value equal to a second sequence number of sent but unacknowledged data minus one, and a segment length value of zero;

receiving a TCP ACK segment that acknowledges the second TCP segment and that contains a second receive window size;

determining whether the second receive window size is greater than a first value that is greater than or equal to one; wherein the first value is based at least in part on a size that prevents data fragmentation;

sending the data to the TCP application only when the second receive window size is greater than the first value;

incrementing a counter when the data is not sent to the TCP application; and re-performing the steps of creating and sending only when the counter is less than a second value.

2. A method as recited in claim 1, wherein a BGP application runs on top of the TCP application, and wherein the first value is selected to prevent excessive fragmentation of the data.

3. A method as recited in claim 1, wherein a TCP stack of a router performs the steps.

4. A method, comprising the computer-implemented steps of:

receiving, from a TCP application, a first data segment that comprises a first receive window size of zero;

determining whether data needs to be sent to the TCP application;

in response to the receiving and determining, creating and sending a second segment that contains a first sequence number value equal to a second sequence number of sent but unacknowledged data minus one, and a segment length value of zero;

receiving a third segment that comprises a second receive window size;

determining whether the second receive window size is greater than a first value that is greater than or equal to one; wherein the first value is based at least in part on a size that prevents data fragmentation;

sending data only when the second receive window size is greater than the first value.

5. A method as recited in claim 4, wherein the specified non-zero value is selected to prevent excessive fragmentation of the data.

6. A method as recited in claim 4, wherein a timer is set after determining whether the data needs to be sent to the TCP application, and wherein the steps of creating and sending are performed only when the timer expires.

7. A method as recited in claim 4, wherein a counter is incremented when the data is not sent, and wherein the steps of creating and sending are re-performed only when the counter is less than a specified strike value that would trigger a fast retransmission.

8. A method as recited in claim 4, wherein a TCP stack of a router performs the steps.

9. A method as recited in claim 4, wherein the first data segment, second segment, and third segment are TCP segments.

10. A method as recited in claim 4, wherein the creating and sending steps are performed only when data needs to be sent.

11. A volatile or non-volatile computer-readable medium carrying one or more sequences of instructions for detecting a change in a data transmission window size, which instructions, when executed by one or more processors that host a transmission control protocol (TCP) process in a network element, cause the one or more processors to perform the steps of:

receiving, from a TCP application, a first data segment that comprises a first receive window size of zero;

determining whether data needs to be sent to the TCP application;

in response to the receiving and determining, creating and sending a second segment that contains a first sequence number value equal to a second sequence number of sent but unacknowledged data minus one, and a segment length value of zero;

receiving a third segment that comprises a second receive window size;

determining whether the second receive window size is greater than a first value that is greater than or equal to one; wherein the first value is based at least in part on a size that prevents data fragmentation;

sending data only when the second receive window size is greater than the first value.

12. A volatile or non-volatile computer-readable medium as recited in claim 11, wherein a BGP application runs on top of the TCP application, and wherein the first value is selected to prevent excessive fragmentation of the data.

13. A volatile or non-volatile computer-readable medium as recited in claim 11, wherein a timer is set after determining whether the data needs to be sent to the TCP application, and wherein the steps of creating and sending are performed only when the timer expires.

14. A volatile or non-volatile computer-readable medium as recited in claim 11, wherein a counter is incremented when the data is not sent, and wherein the steps of creating and sending are re-performed only when the counter is less than a specified strike value that would trigger a fast retransmission.

15. A volatile or non-volatile computer-readable medium as recited in claim 11, wherein a TCP stack of a router performs the steps.

16. A volatile or non-volatile computer-readable medium as recited in claim 11, wherein the first data segment, second segment, and third segment are TCP segments.

17. A volatile or non-volatile computer-readable medium as recited in claim 11, wherein the creating and sending steps are performed only when data needs to be sent.

18. A network element, comprising:
one or more processors;
means for receiving, from a TCP application, a first data segment that comprises a first receive window size of zero;
means for determining whether data needs to be sent to the TCP application;
means for creating and sending, in response to the receiving and determining, a second segment that contains a first sequence number value equal to a second sequence number of sent but unacknowledged data minus one, and a segment length value of zero;
means for receiving a third segment that comprises a second receive window size;
means for determining whether the second receive window size is greater than a first value that is greater than or equal to one; wherein the first value is based at least in part on a size that prevents data fragmentation;
means for sending data only when the second receive window size is greater than the first value.

19. A network element as recited in claim 18, wherein a BGP application runs on top of the TCP application, and wherein the first value is selected to prevent excessive fragmentation of the data.

20. A network element as recited in claim 18, comprising means for setting a timer responsive to means for whether data needs to be sent to the TCP application, and wherein the means for creating and sending operate only when the timer expires.

21. A network element as recited in claim 18, comprising means for incrementing a counter when the data is not sent, and wherein the means for creating and sending are re-performed only when the counter is less than a specified strike value that would trigger a fast retransmission.

22. A network element as recited in claim 18, wherein a TCP stack of a router performs the steps.

23. A network element as recited in claim 18, wherein the first data segment, second segment, and third segment are TCP segments.

24. A network element as recited in claim 18, wherein the creating and sending steps are performed only when data needs to be sent.

25. An apparatus, comprising:
one or more processors;
a network interface coupled to a network for communicating one or more packet flows to the network;
a volatile or non-volatile computer-readable medium accessible to the one or more processors and carrying one or more sequences of instructions for preventing network reset attacks, which instructions, when executed by one or more processors that host a transmission control protocol (TCP) process in a network element, cause the one or more processors to perform the steps of:
receiving, from a TCP application, a first data segment that comprises a first receive window size of zero;
determining whether data needs to be sent to the TCP application:
in response to the receiving and determining, creating and sending a second segment that contains a first sequence number value equal to a second sequence number of sent but unacknowledged data minus one, and a segment length value of zero;
receiving a third segment that comprises a second receive window size;
determining whether the second receive window size is greater than a first value that is greater than or equal to one; wherein the first value is based at least in part on a size that prevents data fragmentation;
sending data only when the second receive window size is greater than the first value.

26. An apparatus as recited in claim 25, wherein a BGP application runs on top of the TCP application, and wherein the first value is selected to prevent excessive fragmentation of the data.

27. An apparatus as recited in claim 25, wherein a timer is set after determining whether the data needs to be sent to the TCP application, and wherein the steps of creating and sending are performed only when the timer expires.

28. An apparatus as recited in claim 25, wherein a counter is incremented when the data is not sent, and wherein the steps of creating and sending are re-performed only when the counter is less than a specified strike value that would trigger a fast retransmission.

29. An apparatus as recited in claim 25, wherein a TCP stack of a router performs the steps.

30. An apparatus as recited in claim 25, wherein the first data segment, second segment, and third segment are TCP segments.

31. An apparatus as recited in claim 25, wherein the creating and sending steps are performed only when data needs to be sent.

* * * * *

UNITED STATES PATENT AND TRADEMARK OFFICE
CERTIFICATE OF CORRECTION

PATENT NO. : 7,613,118 B2 Page 1 of 1
APPLICATION NO. : 11/133622
DATED : November 3, 2009
INVENTOR(S) : Appanna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 946 days.

Signed and Sealed this

Nineteenth Day of October, 2010

David J. Kappos
*Director of the United States Patent and Trademark Office*